United States Patent [19]

Carlqvist et al.

[11] 4,107,475

[45] Aug. 15, 1978

[54] RECEIVER APPARATUS FOR DETECTION OF TWO VOICE FREQUENCIES IN A MULTIFREQUENCY TONE SIGNAL

[75] Inventors: Bengt Roland Carlqvist, Stockholm; Anders Gunnar Eriksson, Johanneshov, both of Sweden

[73] Assignee: Telefonaktiebolaget L M Ericsson, Stockholm, Sweden

[21] Appl. No.: 756,115

[22] Filed: Jan. 3, 1977

[30] Foreign Application Priority Data

Mar. 9, 1976 [SE] Sweden .................. 7603136

[51] Int. Cl.² ........................................... H04M 1/50
[52] U.S. Cl. ........................................... 179/84 VF
[58] Field of Search ............ 179/84 R, 84 VF, 2 A; 328/138, 139, 140

[56] References Cited

U.S. PATENT DOCUMENTS

| 3,875,347 | 4/1975 | Alaily | 179/84 VF |
| 3,934,096 | 1/1976 | Kusano | 179/84 VF |
| 4,004,105 | 1/1977 | Mizukoshi | 179/84 VF |

*Primary Examiner*—Kathleen H. Claffy
*Assistant Examiner*—Joseph A. Popek
*Attorney, Agent, or Firm*—Hane, Roberts, Spiecens & Cohen

[57] ABSTRACT

The invention relates to a reference rectifier in a multifrequency signal receiver for obtaining a correct detection of the two signalling frequencies in an incoming voice frequency signal independently of disturbing signals of varying frequency and duration. The rectifier has a first signal path including a peak rectifier for creating a first signal level in dependence on the incoming signal level which is compared with the signal component having a frequency equal to one tone in the incoming voice frequency signal. The rectifier also has a second signal path including a mean value creating circuit which, in dependence on the incoming signal gives a second signal whose level is smaller than said first signal level. A number of diodes is connected between the outputs of the receiver and the first signal path to inhibit the output signal from this signal path in dependence on the comparison between the signal level from the first signal path and the signal component having the frequency equal to one tone in the incoming voice frequency signal.

4 Claims, 7 Drawing Figures

RECEIVER APPARATUS FOR DETECTION OF TWO VOICE FREQUENCIES IN A MULTIFREQUENCY TONE SIGNAL

The invention relates to a reference rectifier in a multifrequency signal receiver in order to obtain a correct detection of the two signalling frequencies in an incoming voice frequency signal independently of disturbing signals of varying frequency and duration.

The rectifier comprises a first signal path including first circuit means, for example, a peak rectifier for creating a first signal level in dependence on the incoming signal level. This signal level is compared with the signal component having the frequency equal to one tone in the incoming voice frequency signal.

The rectifier also comprises a second signal path including second circuit means, for example, a mean value creating circuit which in dependence on the incoming signal gives a second signal whose level is smaller than said first signal level. A number of diodes is connected between the outputs of the receiver and the first signal path to inhibit the output signal from this signal path in dependence on the comparison between the signal level from the first signal path and said signal component having the frequency equal to one tone in the incoming voice frequency signal.

The present invention relates to a MFC-signalling receiver apparatus for the detection of an incoming multifrequency tone signal which consists of two voice frequencies of determined value. More specifically, the invention relates to a reference rectifier which produces such a reference signal in the receiver apparatus that a correct detection of the voice frequencies included in the tone signal can also be obtained when disturbing signals of varying frequency and duration are present.

When signalling, for example, between two telephone exchanges, it is common to use so called MFC-signalling wherein the transmission of signal information from one exchange to another is a combination of two different frequencies. The frequencies included in the tone signal are then selected from six different frequency values according to a certain code. The transmitted tone signal which represents the signal information, thus includes two frequency components and the frequency combination being selected represents the signal information which is desired to be transferred, for example, signal information about clearing, dialling etc. from the transmitting exchange.

Obviously it is important that the receiving exchange reliably detects what frequency combination has been transmitted from the transmitting exchange in order to give a correct evaluation of the transferred signal information. A disturbing signal appearing at the receiving exchange containing some of the frequency values intended for signalling can be erroneously detected in the signal receiver of the receiving exchange and thus give false signal information. The purpose for using two different frequencies in a certain code according to the principle of MFC-signalling is to avoid the above mentioned risks of erroneous detection of transient disturbing signals. However, this condition does not always give a reliable detection when disturbing signals of different frequencies and long duration appear in the telecommunication equipment.

It is previously known to establish a reference level from the incoming signal to a MFC-signalling receiver which is compared with the level of one of the tone signals recovered in the receiver.

An object of the present invention is to provide a reference rectifier in a MFC-signalling receiver for correct detection of incoming signalling information independent of incoming disturbing signals of varying frequency and duration.

The invention, the characteristics of which appear from the appended claims will now be closely described with reference to the accompanying drawing. In the drawing:

Figure 4:
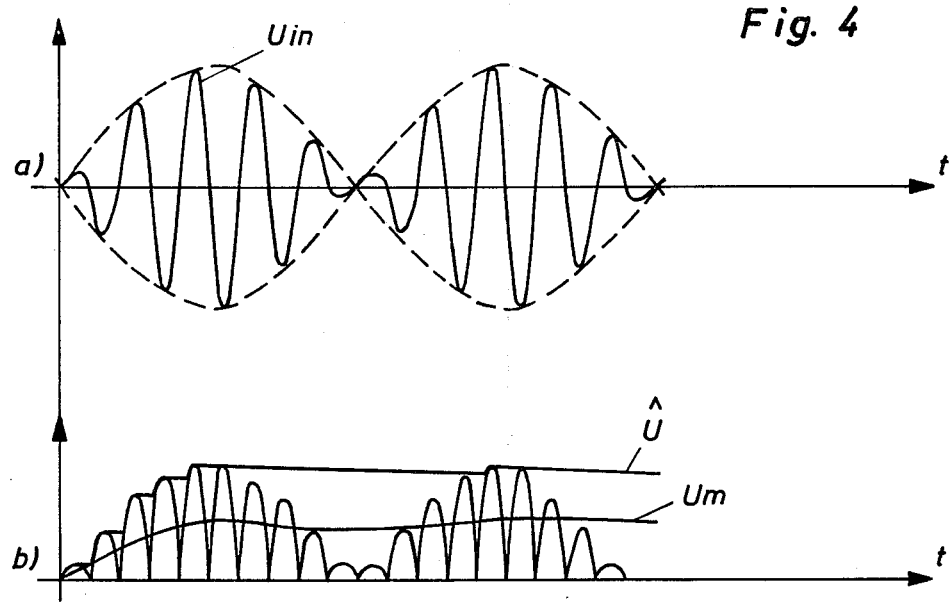
Figure 5:
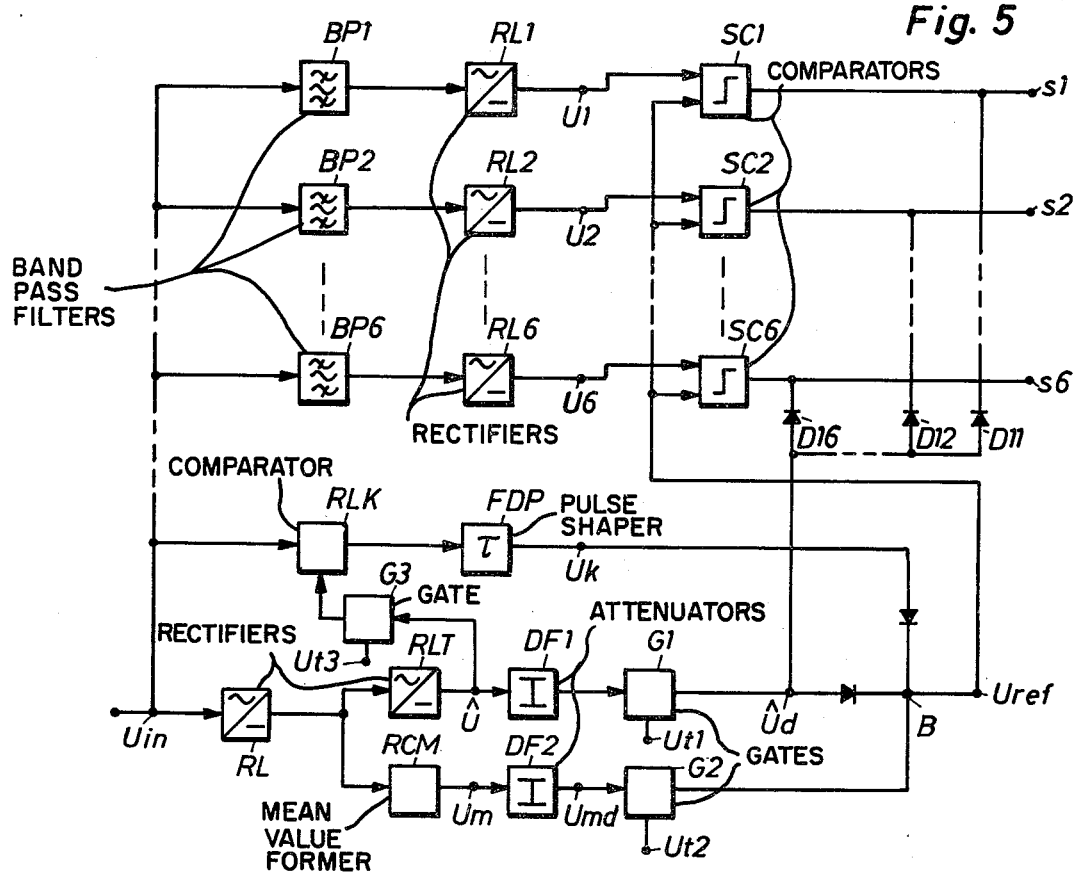
Figure 6:
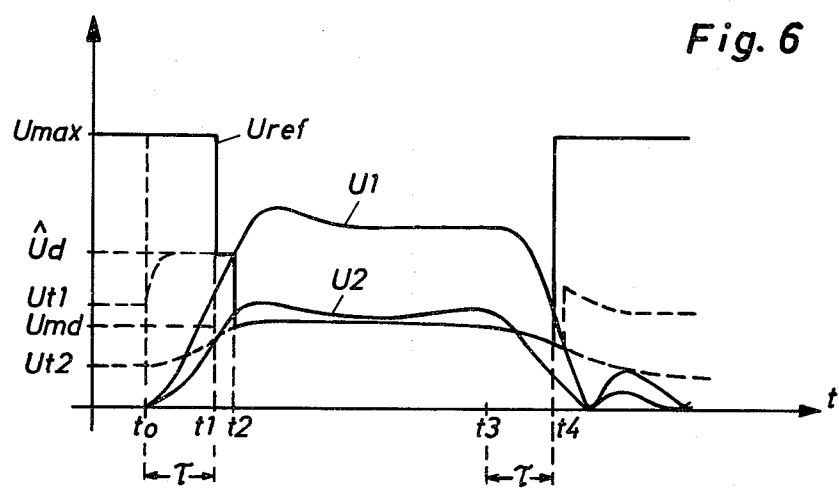

FIGS. 4a, and b show a timing diagram illustrating the waveform of an incoming signal to the receiver and the waveform of certain signals which appear in the reference rectifier according to the invention;

FIG. 5 shows a block diagram of a receiver in which the reference rectifier according to the invention is combined with a holding circuit;

FIG. 6 shows a timing diagram illustrating the waveforms of certain signals which appear in the receiver according to FIG. 5.

Figure 1:
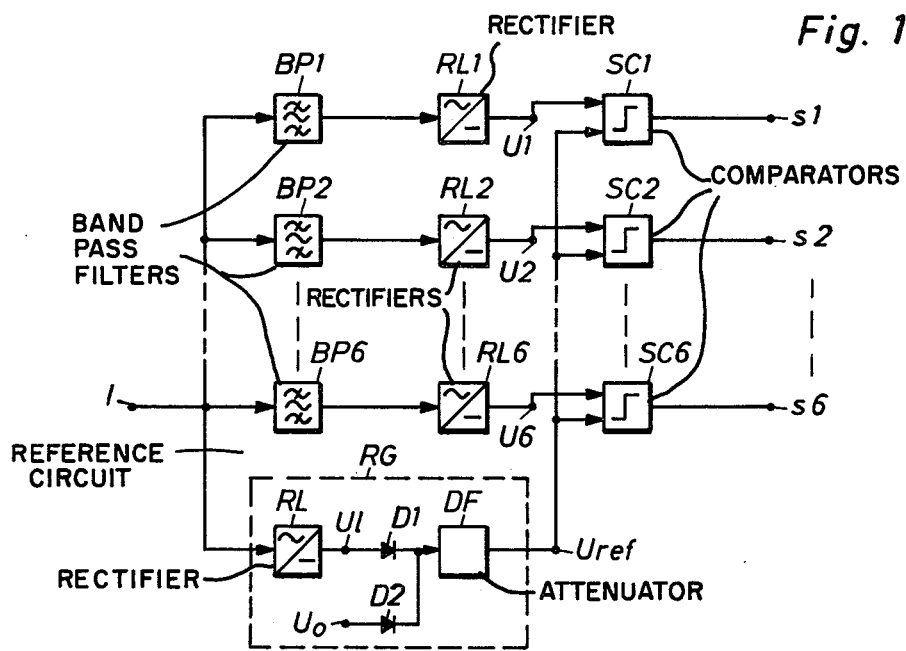
FIG. 1 shows a block diagram of a MFC-signalling receiver of known kind.

In order to fully illustrate the principle of the invention, the known MFC-signalling receiver of FIG. 1 will now be described. The known receiver comprises a number of signalling paths connected in parallel, where each of the signalling paths consists of a bandpass filter BP1-BP6, a rectifier RL1-RL6 and a signal comparator SC1-SC6. The outputs $s1-s6$ of each signal comparator SC1-SC6 form the outputs of the receiver and are connected to a subsequent indication device, for example, the winding of a relay. A reference giving unit RG is connected in parallel with the signal paths to deliver a reference signal Uref to the signal comparators SC1-SC6 in dependence on the incoming signal level. Each signal comparator has two inputs and an output, the comparator comparing the input signals and giving an output signal if the signal from the input which is connected to the typically output U1 exceeds the reference signal Uref across the second input. Across the input I of the receiver, a tone signal normally appears which contains the two frequency components being selected to transfer signalling information and which should be detected in the receiver. The number of signaling paths is equal to the number of frequencies $f1-f6$ from which the two frequency components included in the tone signal have been selected. Each bandpass filter BP1-BP6 is tuned to each of the frequencies $f-f6$.

It it is assumed that the incoming tone signal contains the frequencies $f1$ and $f2$, an unattenuated signal appears across the output U1 of the rectifier RL1 and across the output U2 of the rectifier RL2. At the same time, the incoming signal to the receiver containing the frequencies $f1$ and $f2$ appears across the input of the reference giving unit RG. This unit contains a rectifier RL in series with a diode D1 and an attenuation circuit DF. Between the diode D1 and the attenuation circuit DF a threshold voltage Uo is connected via the diode D2. When the incoming signal level is so low that the rectified value U1 is below the threshold voltage Uo, the diode D2 conducts and the diode D1 blocked, the reference voltage Uref is thus proportional to the threshold voltage Uo. When the level of the incoming signal is so high that its rectified value $Ul$ is greater than the threshold voltage Uo, then the diode D1 conducts and the diode D2 blocked and the reference voltage Uref is proportional to the incoming tone signal level. If a tone signal which contains, for example, the frequencies $f1$ and $f2$ enters the receiver, the reference voltage is proportional to the rectified value of the incoming signal in the rectifier RL. The rectified output voltages U1 and U2 are both greater than this reference voltage and an output signal from the signal comparators SC1, SC2 is obtained which forms an indication that two correct tone signals have been received. If a tone signal with a wrong frequency or with too low a level enters, none of the output voltages U1–U6 is greater than the reference voltage Uref and thus no output signal from the signal comparators SC1–SC6 is obtained.

Figure 2:
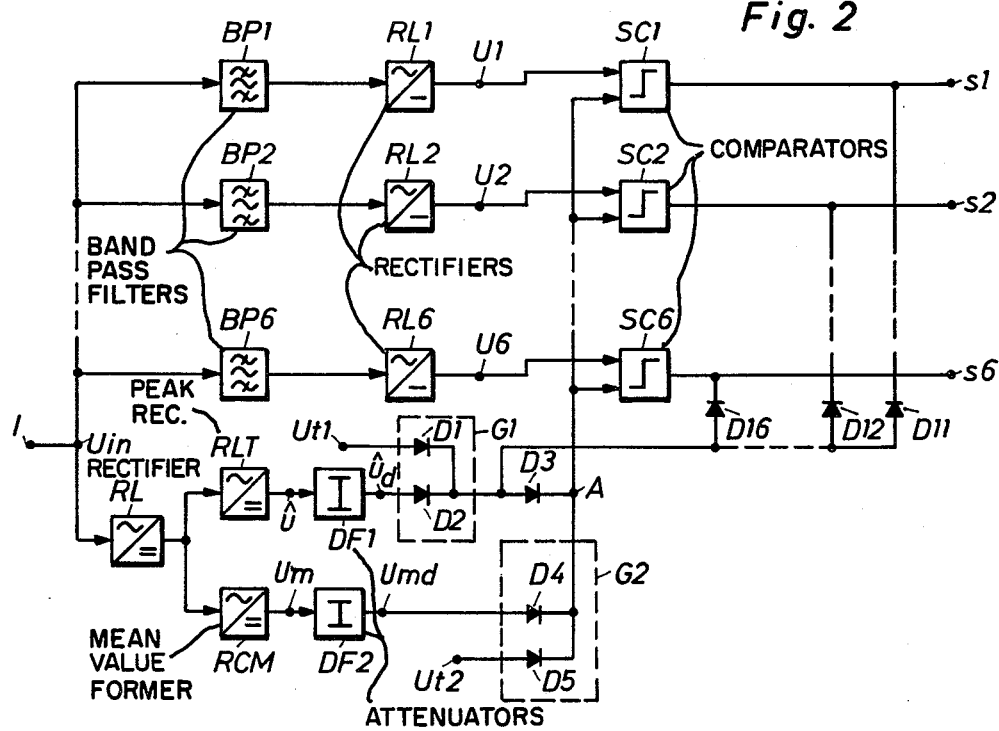
FIG. 2 shows a block diagram of a MFC-signalling receiver in which a reference rectifier according to the present invention is included.

In practice, the tone signal receiver is subject to violent disturbances which can give rise to false indications. In order to reduce the sensitivity of disturbances, the reference giving unit according to the invention can be designed as shown in FIG. 2. In this Figure, the parallel paths of the receiver containing the bandpass filters BP1–BP6, the rectifiers RL1–RL6 and the signal comparators SC1–SC6 are the same, for which reason the same designations for these units have been maintained. The output signals from the respective signal comparator are as in FIG. 1 designated $s1$—$s6$.

The reference rectifier according to FIG. 2 contains a fullwave rectifier RL, which is connected to two parallel signal paths. The first signal path contains a peak rectifier RLT, which across an attenuation circuit DF1 is connected to one input of first gate circuit GI which consists of the diodes D1 and D2. To the second input of the gate circuit, a constant threshold voltage Ut1 is connected. The output of the gate circuit is via the diodes D11–D16 connected to the output of each signal comparator SC1–SC6 and via the diode D3 connected to one input A of each of the signal comparators. Across the output of the gate circuit G1 a signal appears which the greater of the threshold voltage Ut1 and the output signal ÛD from the attenuation circuit DF1. The attenuation value of the attenuation circuit is chosen with respect to the level of the signal Û obtained from the rectifier RLT relative to the level of the output signals from the rectifiers RL1–RL6.

The second signal path contains a mean value forming circuit RCM, for example, a single RC-link whose output signal Um consists of a signal level with mainly constant value which is equal to the mean value of the fullwave rectified incoming signal obtained from the rectifier RL. The circuit RCM is, via a second attenuation circuit DF2, connected to one input of a second gate circuit G2 whose other input is connected to a constant threshold voltage Ut2. The gate circuit G2 consists of the two diodes D4 and D5. On the output of the gate circuit G2 a signal appears which the greater of the threshold voltage Ut2 and the output signal Umd from the attenuation circuit DF2. The gate circuit G2 and the diode D3 form in a similar manner a gate circuit, so that at the point A the highest of the levels of the incoming signals to the gate circuit G1 and the gate circuit G2 is obtained.

Figure 3:
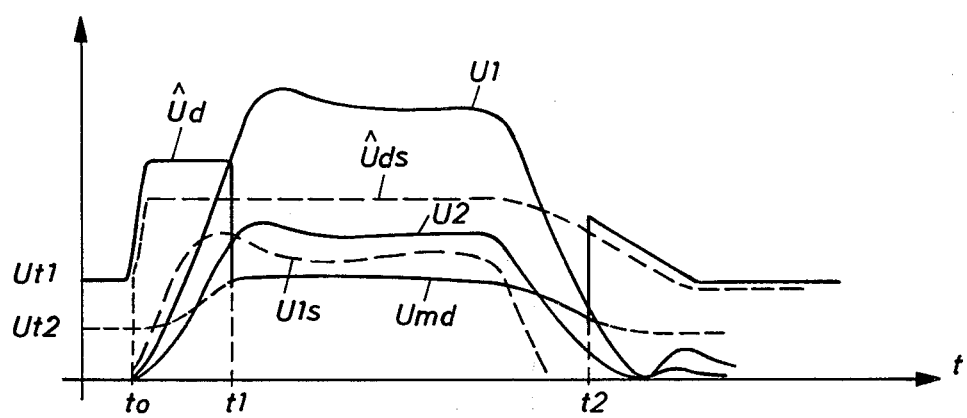
FIG. 3 shows a timing diagram illustrating the waveforms of certain signals appearing in the receiver according to FIG. 2.

In order to describe the operation of the receiver, reference is made to the time diagram according to FIG. 3. When no signal appears at the input of the receiver, the signal levels Ûd and Umd = 0, the level at the point A is equal to the highest of the threshold voltages Ut1, Ut2, for example, equal to Ut1 if Ut1 > Ut2. When a correct incoming signal at the time $t0$ appears at the input of the receiver which signal, for example, contains the frequencies $f1$ and $f2$, an output signal U1, U2 is obtained from the rectifiers RL1, RL2 respectively. At the same time an output signal Ûd appears at the input of the gate circuit G1. This signal appears at the point A, since it is the highest of the existing signal levels. When the output signal U1 at the time $t1$ exceeds the level at the point A, the signal comparator SC1 changes its state and its output signal $s1$ changes its value from high to low level. Hereby, the diode D11 conducts and the diode D3 will be blocked. This implies that the level at the point A is determined either by the level of the output signal Umd from the attenuation circuit DF2 or by the threshold level Ut2. When the level Umd is greater than the level Ut2, the level Umd thus appears at the time $t1$ at the point A. The signal U2 obtained from the bandpass filter BP2 and the rectifier RL2 is however, greater than the level Umd, for which reason also the signal comparator SC2 changes its state as its output signal is changed from a high to a low level. Thus, both the voice frequencies $f1$ and $f2$ are detected in the receiver. The mean value Um and thus the appearing attenuated value Umd in the point A are not influenced by transient disturbances which are superimposed on the correct incoming signal, i.e. detection of the two voice frequenices is obtained even if transients are present in the incoming tone signal.

It is now assumed that a disturbing signal which contains the frequency f1 together with other frequencies which do not coincide with the frequenices $f2$–$f6$ appears at the input of the receiver. This disturbing signal gives rise to an output signal from the rectifier RL1 the characteristics of which appear from FIG. 3, designated U1s. The influence of the disturbing signal on the other bandpass filters BP2–BP6 is assumed to be negligible, i.e. the bandpass filter BP1 is assumed to be the most selective for the disturbing signal. In reality, a considerably lower level is obtained from the rectifier RL1 for the most common disturbing signals to the receiver. Across the point A in FIG. 2 the output signal Ûds now appears from the attenuation circuit DF1 the level of which, however, is higher than the level of the filtered and rectified disturbing signal. The signal comparator SC1 thus cannot change its state and the receiver will be insensitive to the incoming disturbing signal even if this contains a correct voice frequency. In a similar manner the receiver reacts if disturbing signals containing other voice frequencies $f2$, $f3$ etc. appear.

It is apparent that if the receiver has accepted one voice frequency in the incoming signal (change of state in the signal comparator SC1) it is insensitive to disturbances which influence the detection of the other voice frequency. The receiver thus gives a detection of the two voice frequencies in a correct incoming signal or otherwise it rejects an incoming disturbing signal completely, even if this contains one of the correct voice frequencies.

In FIG. 4a the characteristics of a correct incoming signal to the receiver are shown (a so called beat) and in FIG. 4b the characteristics of the signal level Û, Um from the peak rectifier RLT and from the mean value forming circuit RC, respectively are shown.

The reference rectifier according to the invention can be combined with a holding circuit which blocks the receiver for incoming signals with short duration. An example of such a holding circuit is described in the Swedish patent application no. 76.01387-9. FIG. 5 shows a block diagram of a receiver with a reference rectifier combined with such a holding circuit. The same designations have been maintained for the blocks which correspond to the blocks according to FIG. 2. The reference rectifier contains as in the block diagram according to FIG. 2, an input rectifier RL connected to two signal paths of the same design as those according to FIG. 2. In parallel with the two signal paths still another signal path is connected which consists of a rectifier-comparator circuit designated RLK together with a delay circuit with a pulse shaper designated FDP. A comparator circuit RLK is with one input connected to the inputs of the receiver and with its other input via a gate circuit G3 connected to the output of the peak value rectifier RLT. The gate circuit G3 is connected to a threshold voltage Ut3. The delay circuit FDP is via a diode connected to the point B which forms the common connection point for the signal paths included in the reference rectifiers.

The timing diagram according to FIG. 6 illustrates the operation of the combined rectifier according to FIG. 5 for a correct incoming tone signal. When the incoming signal Uin to the receiver is less than the threshold voltage Ut3, whose delay circuit FDP delivers a signal Uk=Umax the level is chosen higher than the level of the signal delivered from the rectifier RL1-RL6. At the time $t0$ the incoming signal Uin appears at the receiver and an increasing signal U1, U2 appears across the outputs from the rectifiers RL1, RL2 if it is assumed that the incoming signal Uin contains the frequencies $f1$, $f2$. When the incoming signal Uin exceeds the threshold value Ut3, the comparator circuit RLK changes its output voltage from a high to a low value. After the delay $\tau = t1-t0$ in the delay circuit FDP its output signal Uk is changed from the value Umax to a value which is lower than the threshold voltage Ut1 and Ut2. The reference voltage Uref then decreases from the value Umax to the value Ud, which makes the greatest value after the delay $\tau$ and which via the diode appears in the point B.

At the time $t2$, the output signal U1 from the rectifier RL1 exceeds the reference voltage Uref and the output $s1$ of the comparator SC1 changes from high to low level. In the same manner as described before, the reference voltage Uref is changed from Ud to Umd, whereby also the output signal U2 from the rectifier RL2 is detected.

It is now assumed that the incoming signal Uin disappears at the time $t3$. Then, due to the smoothing time constant in the peak value rectifier RLT, a voltage proportional to the peak value of the incoming signal will remain at one input of the comparator circuit RLK. When the incoming signal across its other inputs becomes less than this remaining voltage, the output voltage from the comparator circuit is changed from a low to a high value. After the delay $\tau$, i.e. at the time $t4$, the reference voltage Uref also assumes the value Umax, whereby the output $s1$ of the comparator SC1 changes its state from low to high level.

We claim:

1. Receiver apparatus for the detection of at least two voice frequencies in an incoming tone signal during MFC-signalling which is insensitive to disturbing signals comprising a reference rectifier and a number of parallel connected signal paths equal to the number of the possible voice frequencies in the incoming tone signal; each of said signal paths having a bandpass filter tuned to a certain voice frequency, a rectifier and an analog signal comparator for comparing the signal obtained from the rectifier with a reference signal produced by said reference rectifier; and said reference rectifier having a first signal path including a first circuit means for generating a first signal level in dependence on the incoming signal level for comparison with a signal obtained from one of the rectifiers in said parallel connected signal paths, a second signal path including a second circuit means for generating a second signal level in dependence on the incoming signal level but of lower value than said first signal level, and a number of paths each including means connected between the output of each signal comparator and said first signal path for blocking the output signal from the first signal path in dependence on said comparison, so that a new comparison is carried out between the output signal obtained from the second signal path and a signal obtained from another of the rectifiers in said parallel connected signal paths.

2. Receiver apparatus as claimed in claim 1, wherein said first circuit means comprises a peak rectifier and a first attenuation circuit means whose attenuation is chosen so that the obtained first signal level is less than the level of a first signal filtered out and obtained from the rectifiers in said parallel connected signal paths, but greater than the corresponding level of a disturbing signal containing the same frequency as in the first signal.

3. Receiver apparatus as claimed in claim 2, wherein said second circuit means comprises a mean value forming circuit and a second attenuation circuit whose attenuation is chosen so that the obtained second signal level is less than the level of a second signal filtered out and obtained from the rectifiers in said parallel connected signal paths.

4. Receiver apparatus as claimed in claim 3, wherein a holding circuit is connected in parallel with the two signal paths of the reference rectifier in order to block the receiver apparatus for incoming signals having a time less than a predetermined length of time duration.

* * * * *